United States Patent [19]

Dezael et al.

[11] 4,044,114

[45] Aug. 23, 1977

[54] PROCESS FOR PURIFYING A GAS CONTAINING SULFUR COMPOUNDS

[75] Inventors: Claude Dezael, Maisons Laffitte; Sigismond Franckowiak, Rueil Malmaison; Philippe Courty, Colombes; Henri Gruhier, Chatillon, Bagneux, all of France

[73] Assignee: Institut Francais du Petrole, Rueil-Malmaison, France

[21] Appl. No.: 641,223

[22] Filed: Dec. 16, 1975

[30] Foreign Application Priority Data

Dec. 27, 1974 France .............................. 74.43201

[51] Int. Cl.$^2$ .............................................. C01B 17/04
[52] U.S. Cl. .................................. 423/574 R; 423/576
[58] Field of Search ............... 423/230, 231, 573, 574, 423/576

[56] References Cited

U.S. PATENT DOCUMENTS

| 1,915,364 | 6/1933 | Harrell ................................. 423/574 |
| 2,747,968 | 5/1956 | Pieache ................................ 423/230 |
| 3,812,243 | 5/1974 | Landrum et al. .................... 423/574 |
| 3,845,197 | 10/1974 | Renault et al. .................. 423/576 X |
| 3,848,071 | 11/1975 | Groenendaal ....................... 423/574 |
| 3,896,215 | 7/1975 | Bratzler et al. ...................... 423/574 |
| 3,947,547 | 3/1976 | Groenendaal et al. .......... 423/230 X |

FOREIGN PATENT DOCUMENTS 909,108 10/1962 United Kingdom

*Primary Examiner*—G. O. Peters
*Attorney, Agent, or Firm*—Millen & White

[57] ABSTRACT

Process for purifying a gas containing hydrogen sulfide and sulfur dioxide, comprising substantially removing sulfur dioxide, absorbing hydrogen sulfide on a solid contact mass, intermittently regenerating said mass by means of an oxygen-containing gas, so as to produce a gas containing sulfur dioxide, and reacting the latter gas with hydrogen sulfide to produce sulfur.

7 Claims, No Drawings

PROCESS FOR PURIFYING A GAS CONTAINING SULFUR COMPOUNDS

Various techniques are known for carrying out Claus reactions (oxidation of $H_2S$ by means of oxygen or sulfur dioxide):

$$2 H_2S + O_2 \rightarrow 2 S + 2 H_2O \qquad (I)$$

or $$2 H_2S + SO_2 \rightleftharpoons 3 S + 2 H_2O \qquad (II)$$

According to a first technique in gaseous phase, the reactants are passed through an either purely thermal or catalytic reaction zone at a temperature higher than the sulfur dew point. This technique does not provide for a thorough elimination of sulfur compounds.

Another technique, in liquid phase, carried out according to scheme (II) as above, consists of contacting $H_2S$ and $SO_2$ with a liquid phase, for example molten sulfur or an organic solvent such as a glycol, a polyglycol, a heavy alcohol, a heavy ether, a heavy ester or a phosphoric ester, which may contain a catalyst, at a temperature usually lower than 200° C. This technique provides for a more thorough purification than the first technique; they can be, accordingly, associated to each other: the effluent obtained from the first technique being treated according to the second technique.

However, in most cases, these effluents still contain a too high proportion of sulfur compounds, in view of the requirements of the present anti-pollution regulations.

The object of the invention is to lower the sulfur content of the effluents from sulfur producing units operated in gaseous phase. These effluents contain sulfur, mainly as $H_2S$ and $SO_2$ and, possibly, elemental sulfur, COS and $CS_2$.

The process according to the invention for purifying a gas containing $H_2S$ and $SO_2$ and issued from a unit (A) for producing sulfur by oxidizing hydrogen sulfide by means of molecular oxygen or sulfur dioxide, comprises a step known per se, of at least partially removing sulfur dioxide, so as to form a gas of lower sulfur dioxide content which contains a substantial amount of hydrogen sulfide, passing the latter gas over a mass for the absorption of hydrogen sulfide, periodically interrupting the contact of the gas with said mass, subsequently passing over the same a gas containing molecular oxygen for regenerating it, recovering the effluent sulfur dioxide containing gas from the regeneration step and feeding this gas to a unit (B) for producing sulfur where it is reacted with hydrogen sulfide. Preferably, unit (B) is not separate from unit (A) as defined above.

Any mass capable to absorb $H_2S$ and to be regenerated by a stream of gas containing free oxygen can be used. Desulfurizing masses which are particularly efficient are described in the patent application filed on the same day for "A process for purifying a gas containing hydrogen sulfide and contact masses usable therefore" Ser. No. 641,352 whose subject matter is incorporated herein by way of reference.

The preferred masses contain by weight, from 20 to 85% (preferably from 25 to 80%) of zinc oxide, calculated as ZnO, from 0.9 to 50% of alumina, calculated as $Al_2O_3$ and from 2 to 45% of an oxide of a group $II_A$ metal, calculated as oxide, with or without additional elements.

The metal from group $II_A$ is, for example, magnesium, barium or preferably calcium.

The preferred additional elements may be silica, in a proportion from 0.1 to 30% by weight and/or one or more oxides of metals M, in a preferred proportion from 1 to 20% by weight, these metals being for example: copper, cadmium, titanium, zirconium, vanadium, chromium, molybdenum, tungsten, manganese, iron, cobalt and/or nickel. The presence of oxides of metals M is favorable to the absorption of sulfur compounds, particularly COS and $CS_2$.

These preferred masses may be obtained by admixing a zinc compound, for example a zinc oxide or carbonate, with an aluminium compound and a compound of metal from group $II_A$, shaped and roasted, for example, at 500° – 1000° C. A major portion of the ZnO in the final mass remains uncombined.

The alumina and the metal from group $II_A$ are preferably introduced in the form of clay or cement, for example a refractory cement containing from 40 to 85% of alumina and from 10 to 40% of oxide of metal $II_A$, for example calcium oxide with or without silica at least 50% of the group IIA metal oxide being in the form of an aluminate or a silico-aluminate.

The desulfurizing masses may be used in fixed bed, in movable bed or in fluid bed.

The removal of $SO_2$ from the treated gas having been preliminarily achieved by known means (hydrogenation or conversion to sulfur) which will be further described in detail hereinafter, the gas is contacted with the desulfurizing mass, on which $H_2S$ and optionally COS and $CS_2$ are absorbed. The absorption mechanism is not well-known. A probable reaction, in the case of masses containing zinc oxide, is as follows:

$$ZnO + H_2S \rightleftharpoons ZnS + H_2O$$

The absorption step is conducted at a temperature from 300° to 800° C, preferably from 400° to 550° C. The inlet pressure is generally higher than the atmospheric pressure in order to compensate for the pressure drops which are generated in the different reactors of the plant.

The VVH (Volume of gas per volume of absorbing mass and per hour) is usually from 50 to 20,000, preferably from 100 to 10,000.

The process can be used for the treatment of a gas containing also steam, for example in a proportion from 1 to 50% by volume, which results in a significant economical advantage. In the presence of large amounts of steam, for example from 20 to 50% by volume, it may be advantageous to conduct the absorption of $H_2S$, COS, $CS_2$ at the lowest temperature compatible with the activity of the absorbing mass. In certain cases, it may be of advantage to condense at least a portion of said water, so as to conform with still more favorable conditions of use of said masses.

The effluent may thus be made substantially free from $H_2S$ contained therein, so that it no longer contain sulfur compounds except as traces. It may be discharged to the atmosphere, optionally after having been burnt.

When the absorbing mass is saturated with sulfur, for example in the form of zinc sulfide, the flow of gas containing $H_2S$ is interrupted and the mass is regenerated by passing in contact therewith an oxygen containing gas, for example air, at a relatively high temperature, for example from 400° to 1200° C, preferably 450°–900° C; there can be used, for example, a portion of the air required for feeding the sulfur production unit. If the air available is not sufficiently hot, it can be advantageous to use the effluent from a $H_2S$ burner operated with oxygen in excess, in order to avoid any unnecessary introduction of other combustion products in the unit. A burner fed with hydrocarbons could also be convenient. The VVH during the regeneration step is, for example, from 100 to 10,000.

There is recovered an effluent gas containing $SO_2$ and also, usually, an excess of oxygen, while the mass recovers its absorbing properties with respect to $H_2S$. According to the invention, this effluent can be fed to the sulfur manufacturing unit, where it supplies, partly, the oxidizing gas ($SO_2$, $O_2$) feed. It can also be fed upstream the burner of the sulfur producing unit, where it partially or completely supplies the oxygen feed. During the regeneration step, it may be advantageous to withdraw, either periodically or continuously, a portion thereof which is fed back to the inlet of the reactor containing the mass in course of regeneration.

The unit is advantageously provided with two reactors RA and RB, connected in series, filled up with a fresh or a regenerated mass. When reactor RA no longer absorbs noticeable amounts of $H_2S$, it is by-passed. Reactor RB, takes the place of reactor RA while a third reactor RC, identical to RA and RB, is connected in series with reactor RB. While the unit is operated with RB and RC, RA is subjected to regeneration. It is also possible to make use of only two reactors, one being in operation for absorption and the other in regeneration.

The step for sulfur dioxide removal, according to a technique known per se, comprises, for example, a step of catalytic hydrogenation of $SO_2$ to $H_2S$ or a step of reacting $SO_2$ with $H_2S$ according to the liquid phase process of sulfur manufacture.

The hydrogenation consists of passing a stream of $SO_2$ containing gas with a reducing gas into contact with a hydrogenation catalyst at a temperature from 150° to 600° C, preferably close to 450° C, so as to convert sulfur dioxide to hydrogen sulfide.

As reducing gas to be used in said step it is preferred to use hydrogen but there can also be used a natural gas, such as methane or a mixture of methane with light hydrocarbons, or still a synthetic gas as carbon monoxide or a mixture of carbon monoxide and hydrogen.

This step is preferably conducted in the presence of a catalyst deposited on a carrier and which contains one or more metals and particularly, oxides or sulfides of metals selected preferably from groups $VI_A$, particularly molybdenum or tungsten and/or VIII (iron group) of the periodic classification of elements according to Societe Chimique de France. Other metals such as copper, silver, vanadium, manganese, rhenium and zinc can also be used, either alone or in association with the preceding metals, in the form of metals or metal compounds. We will mention, for example, vanadium oxides, iron, nickel or cobalt sulfides, associations of metals such as manganese, chromium and molybdenum, or still copper and $V_2O_5$. A preferred association comprises cobalt and molybdenum deposited on alumina.

The inorganic oxide carrier which is preferably used, for depositing these catalytic elements, consists, for example, of alumina, magnesia, silica, bauxite, kieselguhr, thoria or zirconia, either alone or as mixtures. More generally, we use alumina carriers of specific surface from 2 to 350 $m^2 g^{-1}$ having a total pore volume from 10 ml/100 g to 60 ml/100 g. The content of metals, expressed as oxides, is for example, from 1 to 20% by weight. The amount of catalyst used in said step is preferably such that the VVH be in the range from 100 to 2,000, and advantageously close to 500 (By VVH, it is meant the volume of treated gas per volume of catalyst and per hour).

When $SO_2$ is removed by reaction with $H_2S$ according to the liquid phase process of sulfur manufacture, for example as described in the French Pat. No. 1,592,092, it is advantageous that the molecular ratio of $H_2S$ to $SO_2$ at the inlet of the reaction zone, be higher than 2. As a matter of fact, there will be obtained, after treatment, an effluent which contains the less $SO_2$ as the ratio is higher.

The two above-mentioned processes for removing $SO_2$ may be combined by proceeding to liquid phase production of sulfur, followed with hydrogenation.

The following examples are given for illustrating the invention:

EXAMPLE 1

A Claus type unit for sulfur production in gaseous phase, producing 90 metric tons/day of sulfur, discharges 10,000 $Nm^3$/hour ($Nm^3$ means that the volume is measured under normal conditions of temperature and pressure) of a fume having the following composition by volume:

| | |
|---|---|
| $SO_2$ | 0.50 % |
| $H_2S$ | 1.15 % |
| $CO_2$ | 4 % |
| $H_2O$ | 29 % |
| S vapor and vesicular | 0.15 % (expressed as $S_1$) |
| $N_2$ | 65.20 % |

This fume is fed to a reactor containing a reaction medium consisting of PEG 400 (polyethyleneglycol having an average molecular weight of 400) with the addition of sodium benzoate (6.5 g/Kg of PEG 400) and where the temperature is 120° C. The solvent is recirculated through the reactor and countercurrently contacts the fume, thereby ensuring the good efficiency of the operation. Sulfur is formed and discharged from the bottom of the reactor and there is recovered at the upper portion a gaseous effluent which contains only, as sulfur compounds, by volume:

| | |
|---|---|
| $SO_2$ | 0.005 % |
| $H_2S$ | 0.210 % |
| S | 0.025 % |

After reheating at 500° C, this effluent, slightly compressed, passes through a reactor R1 containing 10.2 tons of a mass prepared according to the teaching of the Patent application filed this day, by admixing, malaxing with water and extruding the following composition:

| | | | |
|---|---|---|---|
| ZnO | 40 % (by weight) | | |
| Aluminous cement SUPER SEGAR | 60 % comprising | $Al_2O_3$ | 48 % |
| | | CaO | 11.4 % |
| | | $SiO_2$ | 0.06 % |
| | | $Fe_2O_3$ + $Na_2O$ + $K_2O$ + $Mn_2O_3$ + $TiO_2$ | 0.54 % |

This mass, formed of extrudates having a diameter of 6mm, preroasted for 2 hours at 600° C, has a filling density of 1.18 T/m³ and a crushing strength, measured on ERWEKA machine, higher than 1.7 Kg/mm.

It is observed that the sulfur content of the gases, at the outlet of the reactor, is close to 500 ppm (by volume). Said gases are burnt before being discharged to the atmosphere.

After 24 hours of operation, reactor R1 is disconnected from the circuit of the unit and the fume then passes through reactor R2 which was connected to the outlet of reactor R1. A reactor R3 is connected at the outlet of reactor R2, and regeneration of R1 takes place. Through this latter reactor a gas stream is passed for 2 hours at a rate of about 500 m³/h, at 600° C, said gas stream resulting from the combustion of hydrogen sulfide with air in excess. Then air is passed, at room temperature, for 22 hours, over said mass. The resulting fume is introduced upstream the sulfur producing unit, in gaseous phase, the oxygen and $SO_2$ contained therein being deducted from the air feed of the unit.

EXAMPLE 2

The treatment is performed on 10,000 Nm³/h of a fume produced in a sulfur producing unit of the Claus type, said fume having the following composition by volume:

| | |
|---|---|
| $SO_2$ | 0.41 % |
| $H_2S$ | 0.78 % |
| $CO_2$ | 3.6 % |
| COS | 0.25 % |
| $CS_2$ | 0.10 % |
| $H_2O$ | 29 % |
| $H_2$ | 2 % |
| S vapor and vesicular | 0.15 % (expressed as $S_1$) |
| $N_2$ | 63.71 % |

This fume is reheated before its introduction into the hydrogenation reactor where the temperature is close to 450° C and the pressure slightly higher than the atmospheric pressure in order to compensate for the pressure drops. The reactor contains 10 m³ of alumina on which has been deposited, by weight, 3% of NiO and 14% of $MoO_3$ and which has a specific surface of 277 m²/g.

There is thus obtained an effluent containing 1.80% by volume of $H_2S$, carbon dioxide, hydrogen, steam and nitrogen.

This effluent is fed to a reactor in which the temperature is about 500° C and which contains 64 tons of a mass consisting of:

| | |
|---|---|
| ZnO | 60.03 % (b.w.) |
| Alumina cement LUMNITE | 5.00 % |
| Cement SUPER-SECAR | 34.97 %, |

These two cements providing:

| | |
|---|---|
| $Al_2O_3$ | 30.04 % |
| CaO | 8.48 % |
| $SiO_2$ | 0.51 % |
| $Fe_2O_3$ | 0.60 % |
| $Na_2O + K_2O + MgO + Mn_2O_3 + TiO_2$ | 0.34 % | said mass consists of extrudates having a diameter of 5 mm, which have been roasted for 2 hours at 600° C, has a filling density of 1.08 T/m³ and a crushing strength, measured on ERWEKA machine, higher than 1.3 Kg/mm.

The $H_2S$ content of the gas, after this treatment, is lower than 200 ppm by volume.

This gas is finally passed into an incinerator containing 1.5 m³ of a catalyst bed consisting of alumina on which has been deposited by weight, 4% of $V_2O_5$ an 3.5% of $Fe_2O_3$, so as to convert the sulfur contained therein to $SO_2$ before discharging it to atmposhere.

The reactor is operated for 24 hours before proceeding to regeneration by passing, at about 600° C, for 2 hours, over the absorbing mass, a gas stream obtained by combustion of $H_2S$ with an excess of air, at a rate of 6000 m³/h, about 50% of said air being continuously recycled through the mass. Then, an air stream is passed, at room temperature, for 22 hours. During this time, as in example 1, the unit is operated with two other reactors containing the same weight of a similar absorbing mass.

The effluent from said regeneration step is fed upstream the burner of the Claus type unit.

EXAMPLE 3

10,000 Nm³/h of a fume discharged from a sulfur producing unit (90 T/day) and having the following composition:

| | |
|---|---|
| $SO_2$ | 0.37 % |
| $H_2S$ | 0.82 % |
| $CO_2$ | 3.6 % |
| COS | 0.25 % |
| $CS_2$ | 0.10 % |
| $H_2O$ | 29. % |
| $H_2$ | 2 % |
| S vapor and vesicular | 0.15 % (expressed as $S_1$) |
| $N_2$ | 63.71 % | is introduced into a reaction vessel containing a reaction medium consisting of PEG 400 to which sodium benzoate has been added (6.4 g/Kg of PEG 400), in which the temperature is 120° C. The solvent is recirculated through the reactor and countercurrently contacts the fume. Sulfur is formed which is discharged from the bottom of the reactor and there is recovered, at the upper portion, an effluent gas containing 6150 ppm by volume of sulfur compounds, a major part as $H_2S$.

Said effluent is reheated at a temperature close to 350° C, before passing through a reduction reactor containing a catalyst bed consisting of alumina on which is deposited, by weight, 3% of CoO and 14% of $MoO_3$ and having a specific surface of 277 m²/g.

Sulfur and sulfur compounds (other than $H_2S$) are converted to $H_2S$ whose proportion by volume at the outlet of the reactor is 0.615%.

This effluent is then passed through a reactor containing 14.5 tons of an absorbing mass such as described in example 2. The temperature is then about 400° C.

At the outlet, the gas only contains 300 ppm (by volume) of total sulfur. Prior to discharging it to atmosphere, it is incinerated so that only $SO_2$ is discharged.

After 24 hours of operation, the absorbing mass is regenerated as indicated in example 1. 2000 m³/h of air, heated to about 600° C, are required in such case. The recovered effluent is fed upstream the sulfur producing unit.

EXAMPLE 4

10,000 Nm³/h of a fume having the same composition as that of example 3, is treated in the same manner for removing the major part of the sulfur contained therein. At the outlet of the reactor for the conversion of acid gases to sulfur in PEG 400, the effluent fume contains by volume, 6150 ppm of sulfur compounds, a major portion of which is $H_2S$.

It is reheated at a temperature close to 350° C before being passed over an absorbing mass in an amount of 13.75 tons, having the following composition:

| | | | |
|---|---|---|---|
| ZnO | 60.00 % | | |
| $V_2O_5$ | 1.50 % | | |
| $Fe_2O_3$ | 1.50 % | | |
| BaO | 2.00 % | | |
| $TiO_2$ | 2.00 % | | |
| Aluminous cement SUPER SECAR | 33.00 % | which provides: | |
| | | $Al_2O_3$ | 26.40 % |
| | | CaO | 6.27 % |
| | | $SiO_2$ | 0.03 % |
| | | Miscellaneous | 0.30 % |

This mass, consisting of extrudates of a 6mm diameter which have been preroasted for 3 hours at 610° C, has a filling density of 1.13 T/m³ and a crushing strength, measured on ERWEKA machine, higher than 1.6 Kg/mm.

The temperature is about 500° C. A gas is recovered whose sulfur content is 650 ppm by volume and it is burnt before being discharged to atmosphere.

The operation is terminated as in example 3, which requires, in the present case, 2000 m³/h of air preheated to about 600° C.

We claim:

1. A process for purifying a gas containing hydrogen sulfide and sulfur dioxide in a molar ratio of $H_2S$ to $SO_2$ of more than 2 : 1, said gas being discharged from a sulfur production unit in which hydrogen sulfide is oxidized by means of molecular oxygen or sulfur dioxide in gas phase, comprising the steps of (a) contacting the hydrogen sulfide and sulfur dioxide containing gas with molten sulfur or with an organic solvent, thereby producing sulfur by reaction between said hydrogen sulfide and said sulfur dioxide, and recovering separately said produced sulfur and a gas of relatively higher $H_2S$ to $SO_2$ molar ratio, (b) passing the gas recovered from step (a) over a solid zinc oxide containing mass at 300°–800° C. for absorbing hydrogen sulfide and discharging the resultant $H_2S$ depleted gas, (c) periodically interrupting the contact of the gas with said mass and passing over the same at 400°–1200° C. a gas containing molecular oxygen produced by burning hydrogen sulfide with an excess oxygen containing gas, thereby regenerating the mass, and recovering an $SO_2$ containing effluent gas, and (d) reacting said effluent gas with hydrogen sulfide in said sulfur production unit thereby producing additional sulfur.

2. A process according to claim 1, in which the mass for absorbing hydrogen sulfide contains by weight from 20 to 90% of a zinc oxide, from 0.9 to 50% of alumina and from 2 to 45% of a group $II_A$ metal oxide.

3. A process according to claim 2, in which the mass further contains from 1 to 20% by weight of an oxide of at least one metal selected from the group consisting of copper, cadmium, titanium, zirconium, vanadium, chromium, molybdenum, tungsten, manganese, iron, cobalt and nickel.

4. A process according to claim 2, in which the zinc oxide content is from 25 to 80% by weight.

5. A process according to claim 1, in which the gas to be purified also contains carbon oxysulfide and/or carbon sulfide.

6. A process according to claim 1, wherein the zinc oxide containing mass analyzes by weight 20–85% of zinc oxide, 0.9–50% of alumina, 2–45% of a group II A metal oxide, and at least 50% of said group IIA metal oxide is combined with alumina as metal IIA aluminate or silicoaluminate and at least the major portion of said zinc oxide is present as the free oxide.

7. A process according to claim 1, wherein said zinc oxide containing mass results from admixing a zinc compound with a refractory cement analyzing 40–85% by weight of alumina and 10–40% by weight of oxide of a group IIA metal and then heating the mixture to 500°–1,000° C.

* * * * *